US012730770B2

(12) United States Patent
Chadha et al.

(10) Patent No.: US 12,730,770 B2
(45) Date of Patent: Sep. 8, 2026

(54) INCREASING BANDWIDTH OVER A COMMUNICATION CHANNEL INTERCONNECT WITH DATA REQUEST MODIFICATION

(71) Applicant: NVIDIA Corporation, Santa Clara, CA (US)

(72) Inventors: Ish Chadha, San Jose, CA (US); Amit Mahendra Jain, San Jose, CA (US); Qinyi Tang, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/818,001

(22) Filed: Aug. 28, 2024

(65) Prior Publication Data

US 2026/0064617 A1 Mar. 5, 2026

(51) Int. Cl.
*G06F 13/40* (2006.01)

(52) U.S. Cl.
CPC ...... *G06F 13/4063* (2013.01); *G06F 2213/40* (2013.01)

(58) Field of Classification Search
CPC ... G06F 13/38; G06F 2213/40; G06F 13/4063
See application file for complete search history.

(56) References Cited

U.S. PATENT DOCUMENTS

| | | | | |
|---|---|---|---|---|
| 9,025,622 | B1 * | 5/2015 | Gubser | H03M 7/3068 370/474 |
| 2014/0195564 | A1 * | 7/2014 | Talagala | G06F 12/0804 707/802 |
| 2018/0137310 | A1 * | 5/2018 | Schenk | G06F 21/71 |
| 2019/0318117 | A1 * | 10/2019 | Beecham | G06F 16/9024 |

* cited by examiner

*Primary Examiner* — Phong H Dang
(74) *Attorney, Agent, or Firm* — Lowenstein Sandler LLP

(57) ABSTRACT

A device includes a memory and one or more processing devices operatively coupled to the memory. The one or more processing devices to determine that a data request comprises first persistent data, remove the first persistent data from the data request to obtain first dynamic data, generate first modification data representing the first persistent data, combine the first dynamic data and first modification data to obtain a first modified data request, and cause the first modified data request to be transmitted to a second device over a communication link.

17 Claims, 9 Drawing Sheets

INCREASING BANDWIDTH OVER A COMMUNICATION CHANNEL INTERCONNECT WITH DATA REQUEST MODIFICATION

TECHNICAL FIELD

At least one embodiment pertains to processor communications over a link, such as a datalink. For example, at least one embodiment pertains to increasing bandwidth over a communication channel interconnect with data request modification.

BACKGROUND

In certain communication channel interconnects, such as chip-to-chip (C2C) interconnects or die-to-die (D2D) interconnects, data transmitted across a datalink is often segmented into smaller units to facilitate efficient data handling. Each frame includes the data to transfer, and information about the sending device (e.g., a chip or die) and the receiving device (e.g., another chip or die respectively).

BRIEF DESCRIPTION OF DRAWINGS

Various embodiments in accordance with aspects of the disclosure will be described with reference to the drawings, in which.

DETAILED DESCRIPTION

Figure 1:
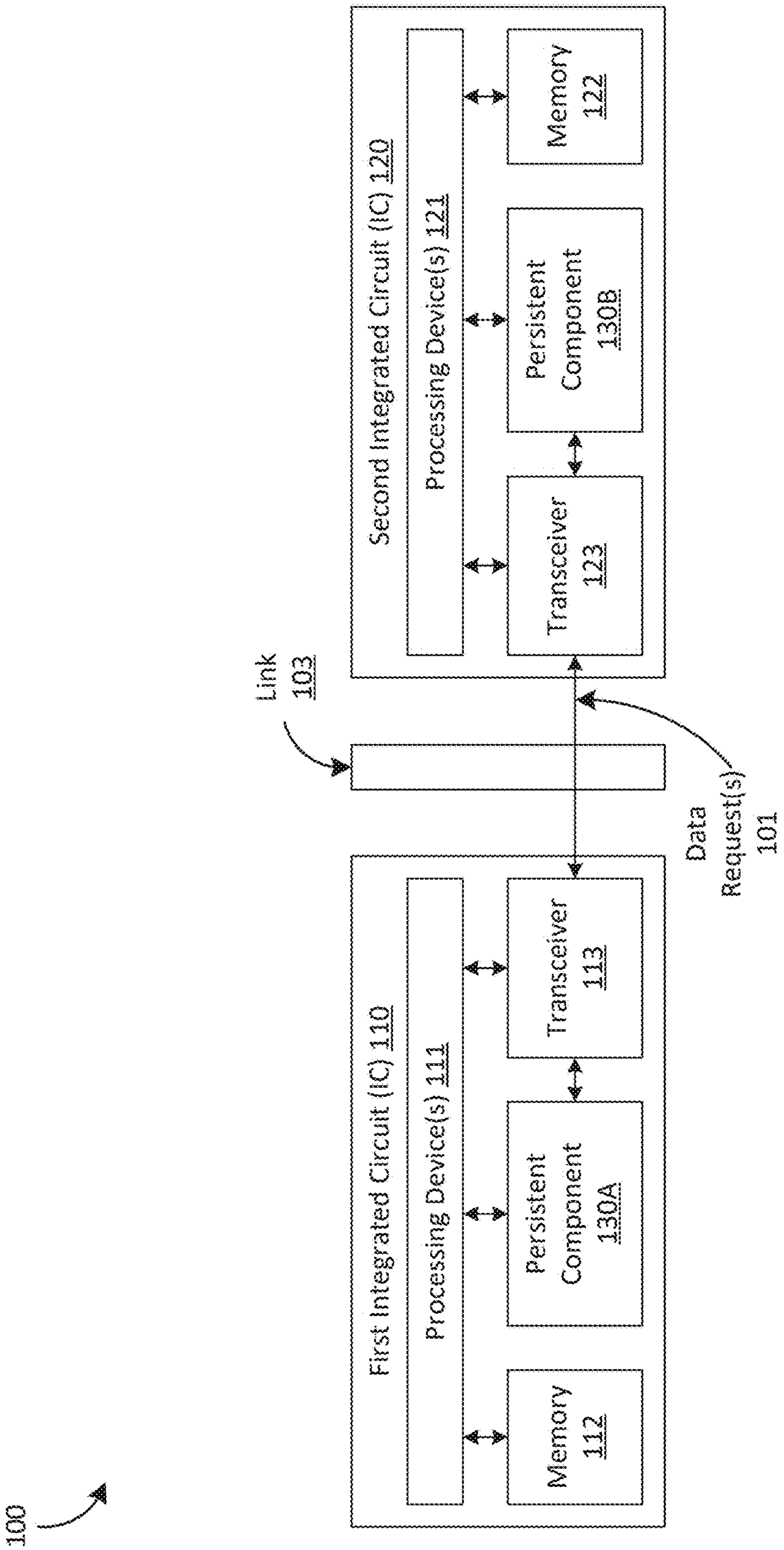
FIG. 1 is an example block diagram of a communication interconnect, according to at least one aspect of the disclosure.

Data can be processed by multiple coupled integrated circuits (ICs) that can each perform different-sometimes specialized-functions. Often these ICs are colloquially referred to as 'chips,' with reference to the final stages of the semiconductor manufacturing process where the ICs (e.g., the chips) are cut from a larger semiconductor wafer. The ICs are packaged with necessary input/output connections, and other circuitry and the resulting product can be referred to as a 'chip.' Thus, a 'communication interconnect,' or 'chip-to-chip (C2C) interconnect' can describe an electrical and data coupling (e.g., interconnect) between at least two distinct packaged ICs (e.g., chips). An unpackaged IC that has been cut from a larger semiconductor wafer can be colloquially referred to as a 'die.' Thus, a 'communication interconnect,' or 'die-to-die (D2D) interconnect' can describe an electrical and data coupling (e.g., interconnect) between at least two distinct unpackaged ICs (e.g., dies).

When data is transmitted across an interconnect (e.g., between chips or dies), the data is often packaged with origination data (e.g., information about the device transmitting the data), receiver data (e.g., information about the device receiving the data), the data to be transmitted, and error correction data. The data along with the information packaged with the data can be referred to as a frame. Often the size of a frame can be limited by the bandwidth of the interconnect. An application can send multiple related frames across the interconnect to perform a given process. Data fields in each of the multiple related frames can include the same or similar information. For example, the origination data and/or the receiver data can be similar or even exactly the same. Thus, valuable bandwidth of the interconnect can be used to transmit unnecessary data. The larger the number of multiple related frames that are sent, the more bandwidth is wasted to send duplicate information. With larger numbers of multiple related frames, the amount of wasted bandwidth can become increasingly significant, which can limit the performance of the transmitting IC (e.g., a chip or die) and the performance of the receiving IC (e.g., a corresponding chip or corresponding die, respectively).

Aspects and embodiments of the disclosure address these and other challenges by providing a persistent data component to extract persistent data from a frame to be sent (also referred to herein as a "data request") and a corresponding persistent data component to reinsert the extracted persistent data back into the data request at a receiving device. Logic of a first IC can send a data request to a first persistent component. The first persistent component can determine whether information to be packaged with the data request (or data that has already been packaged with the data request) includes persistent data. "Persistent data" can refer to information (e.g., data) that is the same (e.g., common or shared) across multiple related data requests. Persistent data can include, for example, data related to the transmitting device (e.g., a source), data related to the receiving device (e.g., a destination), data related to an application, or one or more related processes, and the like.

Upon detecting that the data request includes persistent data, the persistent component can remove the persistent data and add an identifier of the persistent data (e.g., modification data) to the data request. For example, multiple sets of persistent data can be stored in a data structure, and the identifier of the persistent data can be an index of the data structure. The now-modified data request (e.g., the data and modification data identifying the removed persistent data) can be transmitted across the interconnect. When the modified data request is received, a second persistent component coupled to a second IC (e.g., a receiving IC) can identify that the modified data request includes dynamic data and modification data identifying removed persistent data. The second persistent component can use the modification data to reinsert the removed persistent data back into the modified data request. This action converts the modified data request back into the original data request that was sent by logic of the first IC. The reconstructed data request is made available to a second IC for processing.

Advantages of the disclosure include, but are not limited to an increase in available bandwidth of an interconnect, a decrease in the size of data requests (e.g., frames) sent with related data requests, and an overall reduction in latency between a first IC sending a data request and a second IC processing the data request from the first IC. In at least one embodiment, the identifier of the persistent data can have a data size that is smaller than the persistent data to be transferred with the data request. In at least one embodiment, the quantity of data in the dynamic data can be increased to replace the persistent data that was removed. In at least one embodiment, the quantity of modified data requests that are sent simultaneously can be increased. For example, an interconnect can support simultaneous transmission of three unmodified data requests (e.g., data requests that contain the persistent data). When the persistent data is removed from the data requests, the interconnect can support simultaneous transmission of four modified data requests. Still other advantages include a reduction in energy needed to process each data request, and increased configurability of the interconnect.

FIG. 1 is an example block diagram of a communication interconnect 100, according to at least one aspect of the disclosure. The communication interconnect 100 includes first IC 110 and second IC 120 communicatively coupled by link 103. The first IC 110 includes one or more processing device(s) 111, memory 112 operatively coupled to the one or more processing device(s) 111, a persistent component 130A, and a transceiver 113. The second IC 120 includes one or more processing device(s) 121, memory 122 operatively coupled to the one or more processing device(s) 121, a persistent component 130B, and a transceiver 123. It can be appreciated that the first IC 110 and the second IC 120 include similar elements and perform similar operations. As such elements, and operations of the first IC 110 that are described herein similarly apply to the second IC 120, unless otherwise described.

The first IC 110 and the second IC 120 can transmit and receive the data requests 101 across the link 103. In at least one embodiment, the data requests 101 can be transmitted and received over the link 103 in one or more of serially, parallelly, electrically, wirelessly, optically, coherently, noncoherently, or the like. In at least one embodiment, the link 103 can communicatively couple the first IC 110 to the second IC 120. In at least one embodiment, the link 103 communicatively couples additional ICs (not illustrated) to the first IC 110 and the second IC 120. In at least one embodiment, link 103 is one or more of an electrical coupling, a radiofrequency (RF) coupling, an optical coupling, or the like. In at least one embodiment, the link 103 enables communicatively coupled ICs to transmit and receive two-way communications (e.g., as a two-way communication stream).

The first IC 110 can be a computing or processing device that processes data related to the communication interconnect 100. For example, first IC 110 can be a part of, or include a computer processing unit (CPU), a graphics processing unit (GPU), a data processing unit (DPU), a neural processing unit (NPU), an application-specific integrated circuit (ASIC), a field programmable gate array (FPGA), or the like. These computing devices (e.g., the first IC 110 or the second IC 120) can be implemented as components in devices referred to as machines, computers, servers, network devices, or the like. In FIG. 1, the first IC 110 is illustrated as a single device which includes the one or more processing device(s) 111, the memory 112, the persistent component 130A, and the transceiver 113. In at least one embodiment, the first IC 110 is a chip, as described above. In at least one embodiment, the first IC 110 is a die, as described above.

In at least one embodiment, one or more processing device(s) 111 can be one of a CPU, a GPU, a DPU, an NPU, an ASIC, an FPGA, or the like. In such embodiments, the first IC 110 includes circuitry to interface with the one or more processing device(s) 111. For example, and in at least one embodiment, the one or more processing device(s) 111 can be a chip, and the first IC 110 can be a circuit that integrates with the chip. In an alternative example, and in at least one embodiment, the one or more processing device(s) 111 are integrated into a die (e.g., the first IC 110 is a die). In at least one embodiment, the operations of the first IC 110 can be performed by separate devices of the communication interconnect 100. In at least one embodiment, the first IC 110 interfaces with a processing device or controller to transmit and receive data over the link 103 (not illustrated). For example, the one or more processing device(s) 111 can be separate from the first IC 110, and included in another device or integrated circuit (not illustrated). In at least one embodiment, the first IC 110 can cause the data requests 101 to be transmitted to, and received from, the second IC 120. Similarly, the second IC 120 can cause the data requests 101 to be transmitted to, and received from, the first IC 110.

In at least one embodiment, the one or more processing device(s) 111 can cause the first IC 110 to perform one or more operations, such as transmitting and receiving data (e.g., as frames, data requests, etc.) over the link 103. In at least one embodiment, the one or more processing device(s) 111 cause the first IC 110 to transmit a data request 101 to the second IC 120 via the transceiver 113. In at least one embodiment, the one or more processing device(s) 111 cause the first IC 110 to receive a data request from the second IC 120 via the transceiver 113. In at least one embodiment, the data request 101 contains persistent data 222. In at least one embodiment, the data request 101 contains an indication of persistent data.

As illustrated in FIG. 1, the persistent component 130A of the first IC 110 is physically separate from the persistent component 130B of the second IC 120. In at least one embodiment, the operations of the persistent component 130A and the persistent component 130B are the same. In at least one embodiment, the data stored at, or managed by, the persistent component 130A and the persistent component 130B are the same. In at least one embodiment, the first IC 110 can cause indications of the data stored at the persistent component 130A to be transmitted to the first IC 110 (e.g., the persistent component 130B). In at least one embodiment, the first IC 110 can request indications of the data stored at the persistent component 130B be transmitted to the second IC 120 (e.g., the persistent component 130A).

The first IC 110 can cause the persistent component 130A to determine whether a data request 101 includes persistent data 222 (e.g., either a data request 101 to be transmitted, or a data request 101 that has been received). In at least one embodiment, the one or more processing device(s) 111 of the first IC 110 can cause the persistent component 130A to determine whether a data request 101 includes persistent data 222. In at least one embodiment, the persistent component 130A can determine whether the persistent data 222 is associated with a corresponding indication of persistent data (e.g., a data structure index). In at least one embodiment, if the persistent component 130A identifies persistent data 222 in a data request 101 to be transmitted, the persistent component 130A can replace the persistent data 222 with the corresponding indication of persistent data. In at least one embodiment, if the persistent component 130A determines the persistent data 222 is not associated with a corresponding indication of persistent data, the persistent component 130A can generate a corresponding indication of persistent data and store a mapping between the persistent data 222 and the corresponding indication in a data structure of the persistent component 130A.

When the persistent component 130A of the first IC 110 determines a data request 101 contains persistent data 222, the first IC 110 can cause the persistent data 222 and an indication of the persistent data 222 to be transmitted to the second IC 120. In at least one embodiment, when the persistent component 130A of the first IC 110 determines a data request 101 received from the second IC 120 contains persistent data 222, the first IC 110 can request the indication of the persistent data 222 from the second IC 120. In at least one embodiment, when the persistent component 130A of the first IC 110 determines a data request 101 received from the second IC contains persistent data 222, the first IC 110 can generate a corresponding indication of the persistent data 222, and transmit a mapping between the persistent data 222 and the corresponding indication back to the second IC 120.

In at least one embodiment, the persistent component 130A can be a distinct element of the first IC 110, or can be integrated with other elements of the first IC 110, such as the one or more processing device(s) 111. In at least one embodiment, the persistent component 130A includes one or more of hardware, software, and/or firmware. For example, the persistent component 130A can include one or more physical hardware components that perform one or more operations to detect and remove (or insert) persistent data 222. In another example, the persistent component 130A can be implemented as a software function of the one or more processing device(s) 111. In yet another example, the persistent component 130A can be implemented as programmable hardware of the first IC 110 (e.g., as an FPGA).

Figure 2A:
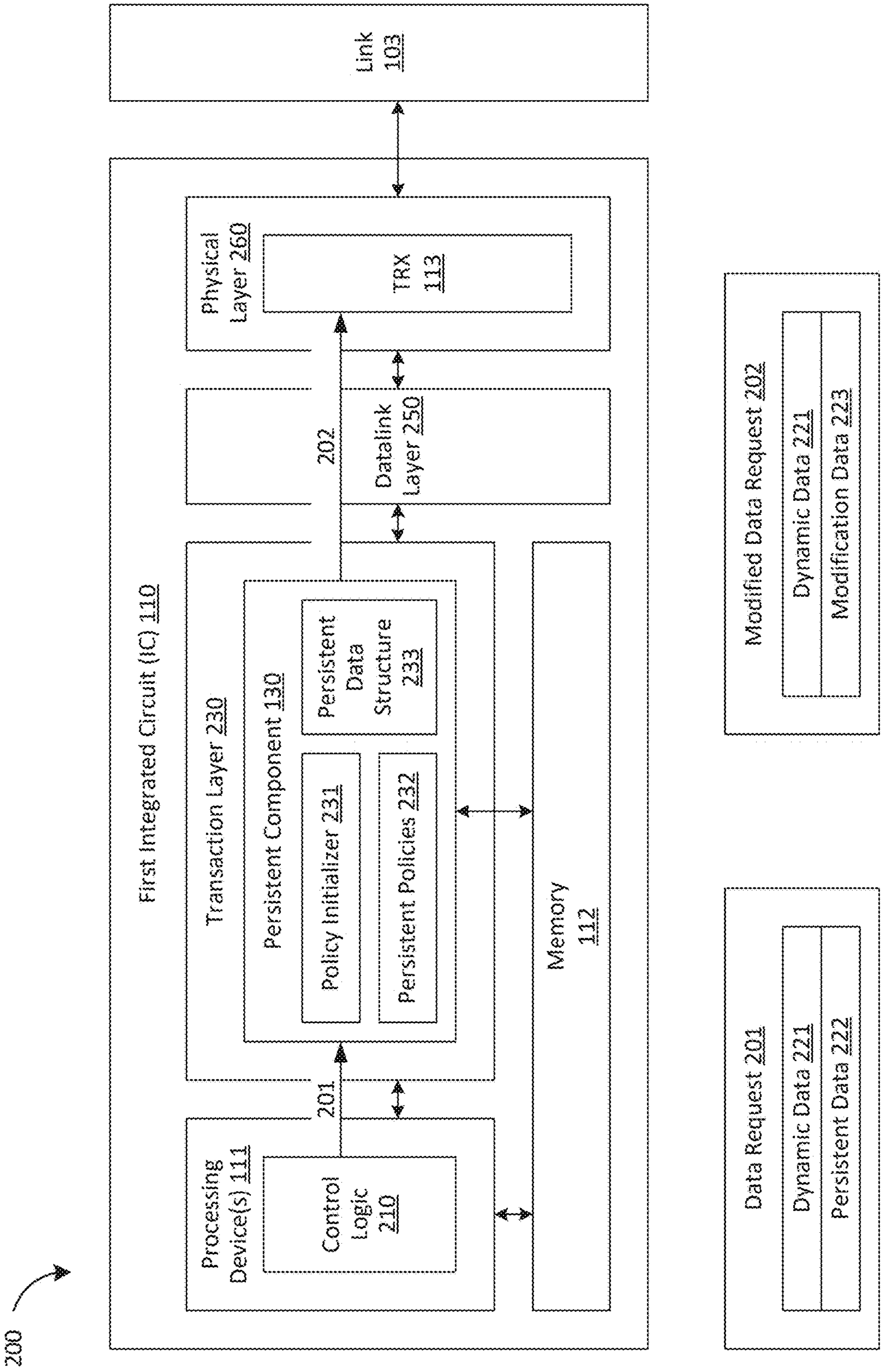
FIG. 2A is an example block diagram of one side of a communication interconnect, according to at least one aspect of the disclosure.

FIG. 2A is an example block diagram of one side of a communication interconnect 200, according to at least one aspect of the disclosure. The communication interconnect 200 includes the first IC 110, and the link 103. FIG. 2A includes elements described with reference to FIG. 1. Except as otherwise described, the elements described with reference to FIG. 1 are the same in FIG. 2A.

The first IC 110 can include the one or more processing device(s) 111 operatively coupled to the memory 112, a transaction layer 230, a datalink layer 250, and a physical layer 260. The persistent component 130 of the first IC 110 can receive a data request 201 from control logic 210 of the one or more processing device(s) 111. In at least one embodiment, the data request 201 can be received from a component outside of the first IC 110 (e.g., a device coupled to the first IC 110, such as a processor, not illustrated).

The transaction layer 230 can include the persistent component 130. The persistent component 130 can include a policy initializer 231, a set of persistent policies 232, and a persistent data structure. In at least one embodiment, the policy initializer 231 and set of persistent policies 232 can be performed by the same component or process. In at least one embodiment, the policy initializer 231 and set of persistent policies 232 can be implemented as one or more of hardware, firmware, or software. In at least one embodiment, the policy initializer 231 can be a pre-programmed data structure (e.g., any of one or more latch(es), flip-flop(s), or register(s)). In at least one embodiment, the set of persistent policies 232 can include one or more bit masks.

In at least one embodiment, the policy initializer 231 can include information that determines how the persistent component 130 identifies persistent data 222. In at least one embodiment, the policy initializer 231 can include a set of pre-determined patterns that the persistent component 130 uses to identify persistent data 222 (e.g., patterns of the persistent data 222 can be hard-coded). For example, the policy initializer 231 can include persistent data 222 for common data requests that are transmitted from, or received by, the first IC 110. This persistent data 222 can be identified by the persistent component 130 using the corresponding persistent policy 232. In at least one embodiment, the persistent policies 232 can be bit masks that are applied to a portion of the data request 201. In at least one embodiment, the policy initializer 231 can include one or more rules or algorithms that the persistent component 130 uses to identify persistent data 222 in real-time (e.g., "on-the-fly"). Once this persistent data 222 is identified, the policy initializer 231 can generate a persistent policy 232 reflecting the detected pattern of persistent data 222. In at least one embodiment, the policy initializer 231 includes software-defined policies (e.g., including a persistent policy 232) and/or software-defined conditions for a persistent policy 232. In at least one embodiment, the policy initializer 231 can update a persistent policy 232 during operation of the communication interconnect 100.

Figure 2B:
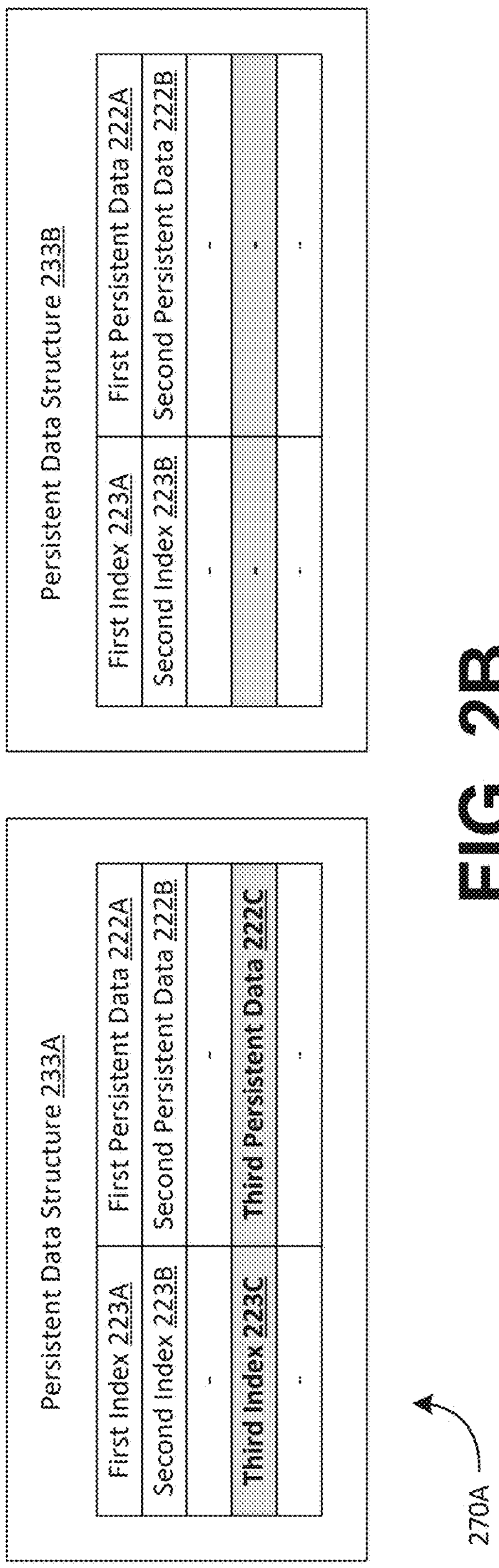
FIG. 2B and FIG. 2C illustrate example block diagrams of persistent data structures, according to at least one aspect of the disclosure.
Figure 2C:
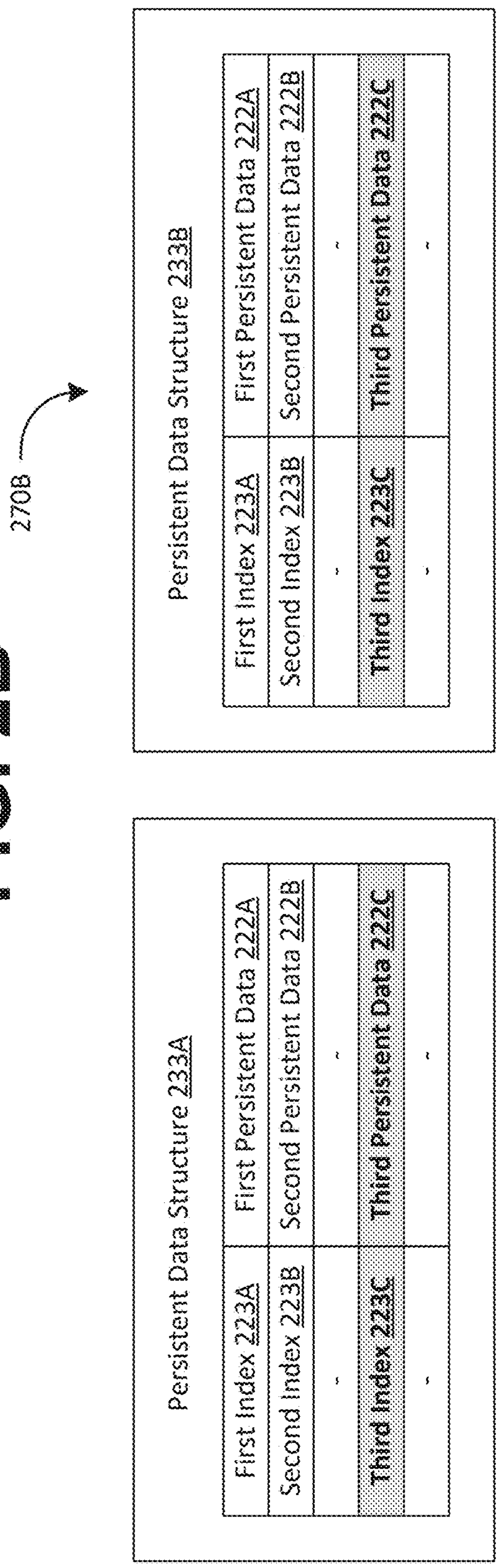

The persistent component 130 can store the persistent data 222 and indications of persistent data 222 (e.g., modification data 223) in a persistent data structure 233. FIG. 2B and FIG. 2C illustrate an example block diagram 270A and an example block diagram 270B of the persistent data structure 233A and the persistent data structure 233B, respectively.

In the example block diagram 270A with reference to FIG. 2B, the first IC 110 has identified that a data request 201 includes data 221 and persistent data 222. The corresponding data structure (e.g., persistent data structure 233A) already has entries for the first persistent data 222A (at the first index 223A), and the second persistent data 222B (at the second index 223B). The persistent component 130 finds an empty entry in the persistent data structure 233A and saves the third persistent data 222C (e.g., the newly identified persistent data in the data request 201) to the third index 223C. In at least one embodiment, the entries in the persistent data structure 233A are non-sequential. In at least one embodiment, the entries in the persistent data structure 233 are sequential. The persistent component 130 can transmit update information to the second IC 120 that reflects the addition of the third persistent data 222C at the third index 223C. In at least one embodiment, the update information is transmitted alongside the data request. In at least one embodiment, the update information is transmitted prior to transmitting the data request. The example block diagram 270A of FIG. 2B illustrates the persistent data structure 233A and the persistent data structure 233B at the time the update information (or data request) is transmitted from the first IC 110 to the second IC 120.

In the example block diagram 270B with reference to FIG. 2C, the second IC 120 has received the update information (or data request) and updated the persistent data structure 233B to match the persistent data structure 233A of the first IC 110. In at least some embodiments, the persistent data structure 233A and the persistent data structure 233B can be synchronized in this way such that each contains identical information (e.g., the first persistent data 222A, the second persistent data 222B, the third persistent data 222C, and the like) at identical logical locations (e.g., respectively at the first index 223A, the second index 223B, the third index 223C, and the like).

Returning to FIG. 2A, as described above, and in at least one embodiment, the persistent component 130 can store a mapping between persistent data 222 (e.g., the third persistent data 222C) and modification data 223 (e.g., third index 223C) in the persistent data structure 233. In at least one embodiment, control logic 210 of the one or more processing device(s) 111 can provide a data request 201 to the persistent component 130. In at least one embodiment, the persistent component 130 identifies persistent data 222 in the data request 201 using one or more persistent policies 232 based on the policy initializer 231. The persistent component 130 can generate a modified data request 202 by replacing the persistent data 222 with modification data 223 using the persistent data structure 233.

In at least one embodiment, the modification data 223 can be an index of the persistent data structure 233 (e.g., third index 223C of FIG. 2B or FIG. 2C) where the persistent data 222 (e.g., the third persistent data 222C of FIG. 2B or FIG. 2C) is stored. In at least one embodiment, the first IC 110 causes the modified data request 202 to be transmitted to another IC (e.g., the second IC 120 of FIG. 1) by the transceiver (TRX) 113 in the physical layer 260 of the first IC 110. In at least one embodiment, if the persistent component 130 does not identify persistent data 222 in the data request 201, the first IC 110 causes the data request 201 to be transmitted to another IC (e.g., the second IC 120 of FIG. 1) by the transceiver 113 of the first IC 110. In at least one embodiment, the persistent component 130 may not identify persistent data 222 in a data request 201 because (i) the data request 201 does not include persistent data 222, (ii) there is not a persistent policy 232 (e.g., a bit mask) that corresponds to the persistent data 222, or (iii) the policy initializer 231 has not initialized a persistent policy 232 that corresponds to the persistent data 222.

In at least one embodiment, when the first IC 110 receives a data request (e.g., from the second IC 120), the first IC 110 can determine whether the data request (e.g., a data request 201) includes persistent data 222, or the data request (e.g., modified data request 202) includes indication of persistent data (e.g., modification data 223). If the data request includes persistent data 222, the first IC 110 can determine whether the persistent data 222 is already stored in the persistent data structure 233. In at least one embodiment, the first IC 110 can update the persistent data structure 233 to reflect the persistent data 222 identified in a data request 201. In at least one embodiment, the first IC 110 can create a new entry in the persistent data structure 233 to reflect the persistent data 222 identified in the data request 201. If the data request includes an indication of persistent data (e.g., modification data 223), the first IC 110 can use the persistent data structure 233 to identify the persistent data 222 that corresponds to the modification data 223. In at least one embodiment, the first IC 110 (or the persistent component 130) can replace the modification data 223 with the corresponding persistent data 222.

In at least one embodiment, when the first IC 110 updates the persistent data 222 stored at, or managed by, the persistent component 130, the first IC 110 can cause update information reflecting the change to be transmitted to the second IC. In at least one embodiment, the update information includes at least (i) the persistent data 222, and (ii) an indication identifying the persistent data 222 (e.g., an index corresponding to an entry in a data structure that stores the particular persistent data 222). In at least one embodiment, the first IC 110 can couple the modification data 223 to a data request 201. The second IC 120 can receive the data request 201, identify the persistent data 222, and store the persistent data 222 based on the modification data 223 coupled to data request 201. In at least one embodiment, the first IC 110 can determine that multiple related data requests (e.g., data requests 201) with the same persistent data are to be transmitted to the second IC 120. The first IC 110 can send an indication of the persistent data 222 and an indication of the modification data 223 (e.g., the index of the persistent data structure 233) to the second IC 120. The second IC 120 can update a respective persistent data structure (e.g., the persistent data structure 233B of FIG. 2B or FIG. 2C).

In at least one embodiment, the first IC 110 can periodically confirm one or more entries of the persistent data structure 233 to one or more corresponding entries of the persistent data structure of the second IC 120. For example, and in at least one embodiment, during down-time, or when a data request is not completely full, the first IC 110 can transmit indications of a pairing between the persistent data 222 and the modification data 223 to the second IC 120. The second IC 120 can update a respective persistent data structure (e.g., the persistent data structure 233B of FIG. 2B or FIG. 2C) to reflect the pairing between the persistent data 222 and the modification data 223. Additional processes or operations can be used to ensure that the contents of the persistent data structure of each IC are identical for the transmission, or reception of data requests.

Figure 3A:
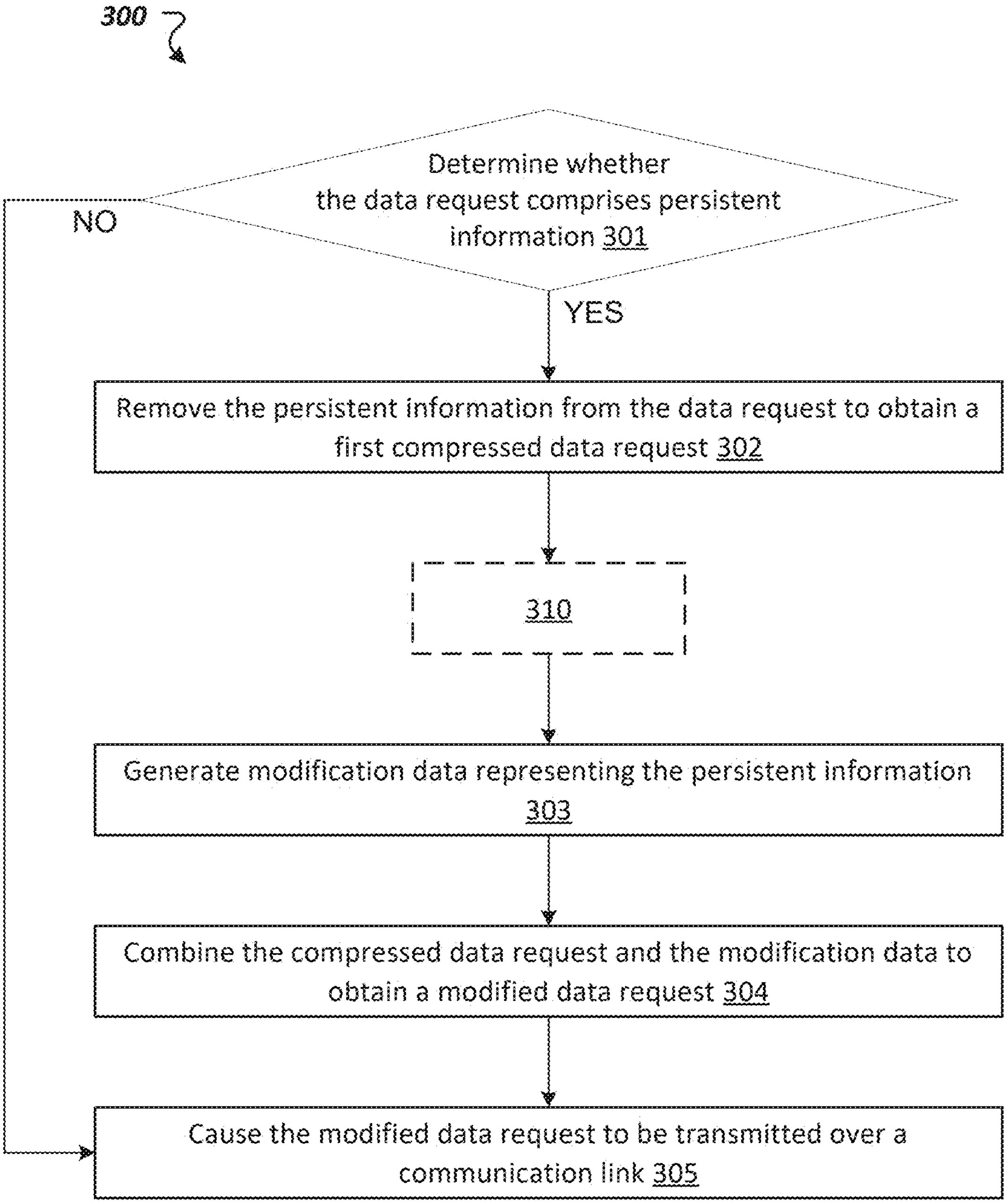
FIG. 3A is a flow diagram of an example method for expanding bandwidth over a communication channel interconnect with data request modification, according to at least one aspect of the disclosure.

FIG. 3A is a flow diagram of an example method 300 for expanding bandwidth over a communication channel interconnect with data request modification, according to at least one aspect of the disclosure. The method 300 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In at least one embodiment, the method 300 is performed by the one or more processing device(s) 111 and/or the persistent component 130A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 301, the control logic performing the method 300 determines whether the data request includes persistent data. As described above, persistent data can be data that is shared across multiple data requests, and can include one or more of data related to the transmitting device (e.g., a source), data related to the receiving device (e.g., a destination), data related to an application, one or more related processes, or the like. In at least one embodiment, the data request can include an indication that the data request contains persistent data. In at least one embodiment, the persistent data can include one or more significant bits in a bit sequence. In at least one embodiment, the data request is received from one or more processing devices. In at least one embodiment, the data request is received from a host or a client. In at least one embodiment, the data request is generated by one or more processing devices as a part of the one or more processing devices processing a request from a host or a client. In at least one embodiment, the data request can include data that is to be processed by another integrated circuit (IC), such as a chip or a die. In at least one embodiment, the data request can be sent as a coherent data request for optical transmission.

At operation 302, responsive to determining the data request does include persistent data, the control logic removes the persistent data from the data request to obtain dynamic data. In at least one embodiment, the control logic can remove the persistent data from the data request to obtain a compressed data request. For example, the persistent data that is identified and removed can be a portion of the data that is common to multiple related data requests (e.g., the control logic may not remove all data that is common). In at least one embodiment, the compressed data request can include the dynamic data, and a portion of data that is common to multiple related data requests that was not identified by the control logic as persistent data. In at least one embodiment, the compressed data request can include additional data, such as link data, or error correction data.

At operation 303, following operation 302 (or the optional operation 310 described with reference to FIG. 3B), the control logic generates modification data representing the persistent data. In at least one embodiment, a size of the modification data is smaller than a size of the persistent data. In at least one embodiment, the modification data is an index corresponding to an entry in a data structure where the persistent data is stored. In at least one embodiment, the modification data includes an indication that that persistent information has been removed from a data request. In at least one embodiment, the modification data includes an indication to update a data structure of the receiving device to reflect persistent data of the data request and modification data corresponding to the persistent data.

In some embodiments, the operations 302 and 303 can include one or more sub-operations, represented here as the operation 310 in dashed lines. In at least one embodiment, these sub-operations can include operations to determine how to remove the persistent data from the data request. In at least one embodiment, the sub-operations can include operations to identify or assign values for the modification data. Additional details regarding the operation 310 are described below with reference to FIG. 3B.

At operation 304, the control logic combines the dynamic data and the modification data to obtain a modified data request. In at least one embodiment, a size of the modified data request is smaller than a size of the original data request.

At operation 305, the control logic causes the modified data request to be transmitted over a communication link. In at least one embodiment, responsive to determining the data request does not include persistent data (e.g., at the operation 301), the control logic moves to the operation 305 where the control logic causes the data request to be transmitted over the communication link.

Figure 3B:
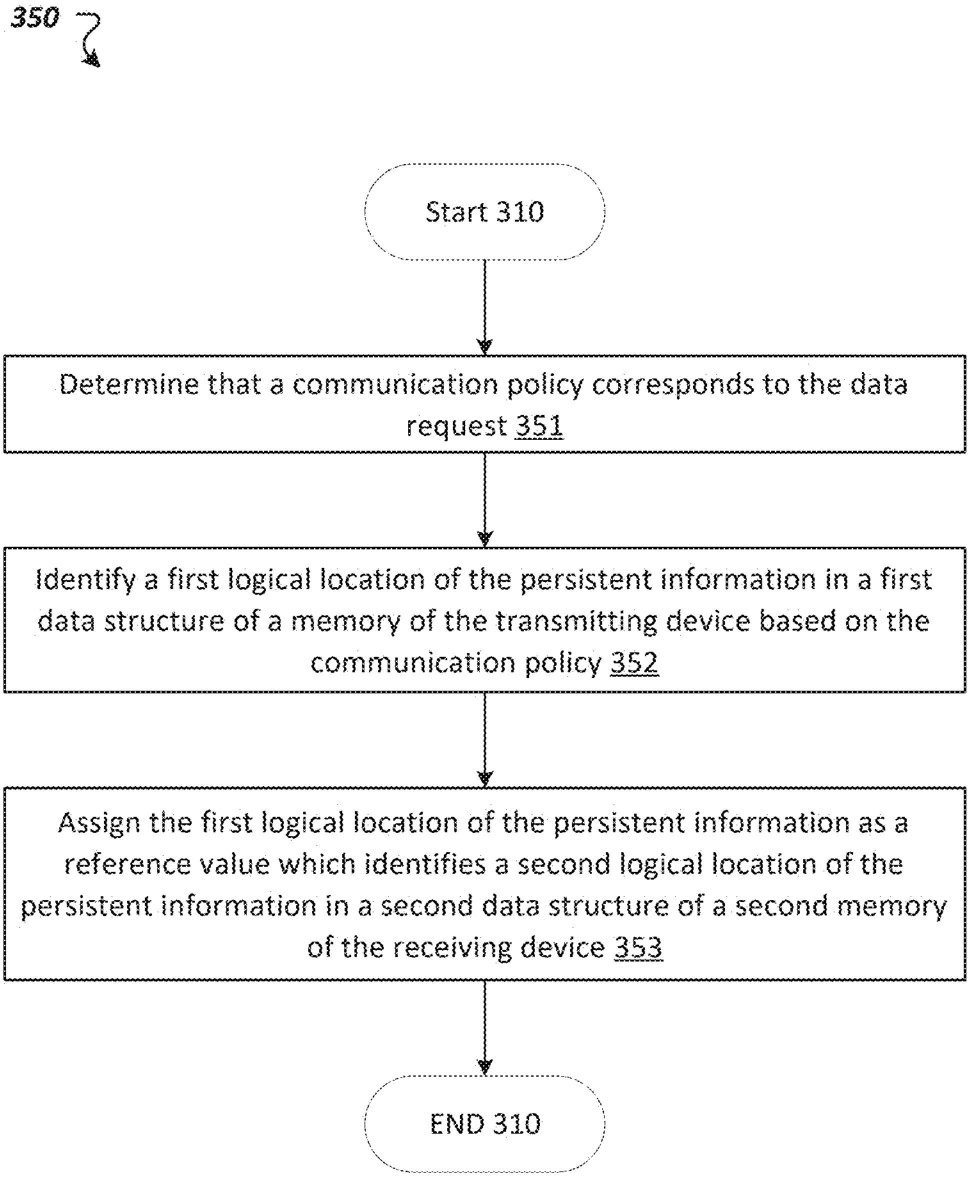
FIG. 3B is a flow diagram of an example portion of a method for expanding bandwidth over a communication channel interconnect with data request modification, according to at least one aspect of the disclosure.

FIG. 3B is a flow diagram of an example portion of a method 350 for expanding bandwidth over a communication channel interconnect with data request modification, according to at least one aspect of the disclosure. The method 350 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In at least one embodiment, the method 350 is performed by the one or more processing device(s) 111 and/or the persistent component 130A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 351, the control logic performing the method 350 determines that a communication policy corresponds to the data request. In at least one embodiment, the control logic determines that a portion of the data request satisfies a condition of the communication policy. In at least one embodiment, the communication policy includes one or more conditions for transmitting and receiving data requests across the communication link. For example, the communication policy can include a condition that explicitly identifies a particular access location (e.g., a set of addresses in the receiving device). In another example, the communication policy can include a condition that identifies a quantity data requests related to a single process, application, or the like. The communication policy can be based on the type of communication across the communication link, and the type of data being transmitted in each data request. In at least one embodiment, the communication policy is based on a specific use-case for operation of the interconnect between the transmitting and receiving device. For example, the communication policy can be specific to a client, a location, a data type, or the like.

In at least one embodiment, the portion of the data request satisfies the condition of the communication policy if one or more data fields of the data request match one or more data filters of the condition of the communication policy. In at least one embodiment, the portion of the data request is compared to the condition of the communication policy. In at least one embodiment, the condition includes a bitmask. In at least one embodiment, the persistent data can be identified and/or removed by applying the bitmask to a portion of the data request using one or more logical operations. The logical operations can include, for example, one or more of a bitwise-and operation, a bitwise-or operation, a bitwise-exclusive-or operation, or a bitwise-not operation.

At operation 352, the control logic identifies a first logical location of the persistent data in a data structure of a memory of the transmitting device based on the communication policy. In at least one embodiment, the persistent data is stored in one or more of a table, a map, a queue, or the like. In at least one embodiment, one or more of hardware, firmware, or software is used to store and access the persistent data from the data structure. In at least one embodiment, the data structure is stored in a dedicated memory that is separate from the memory coupled to a processing device of the transmitting device.

At operation 353, the control logic assigns the first logical location of the persistent data as a reference value which identifies a second logical location of the persistent data in a second data structure of a second memory of the receiving device. In at least one embodiment, the reference value identifies a first logical location of the persistent data in a first data structure of the transmitting device.

Figure 4:
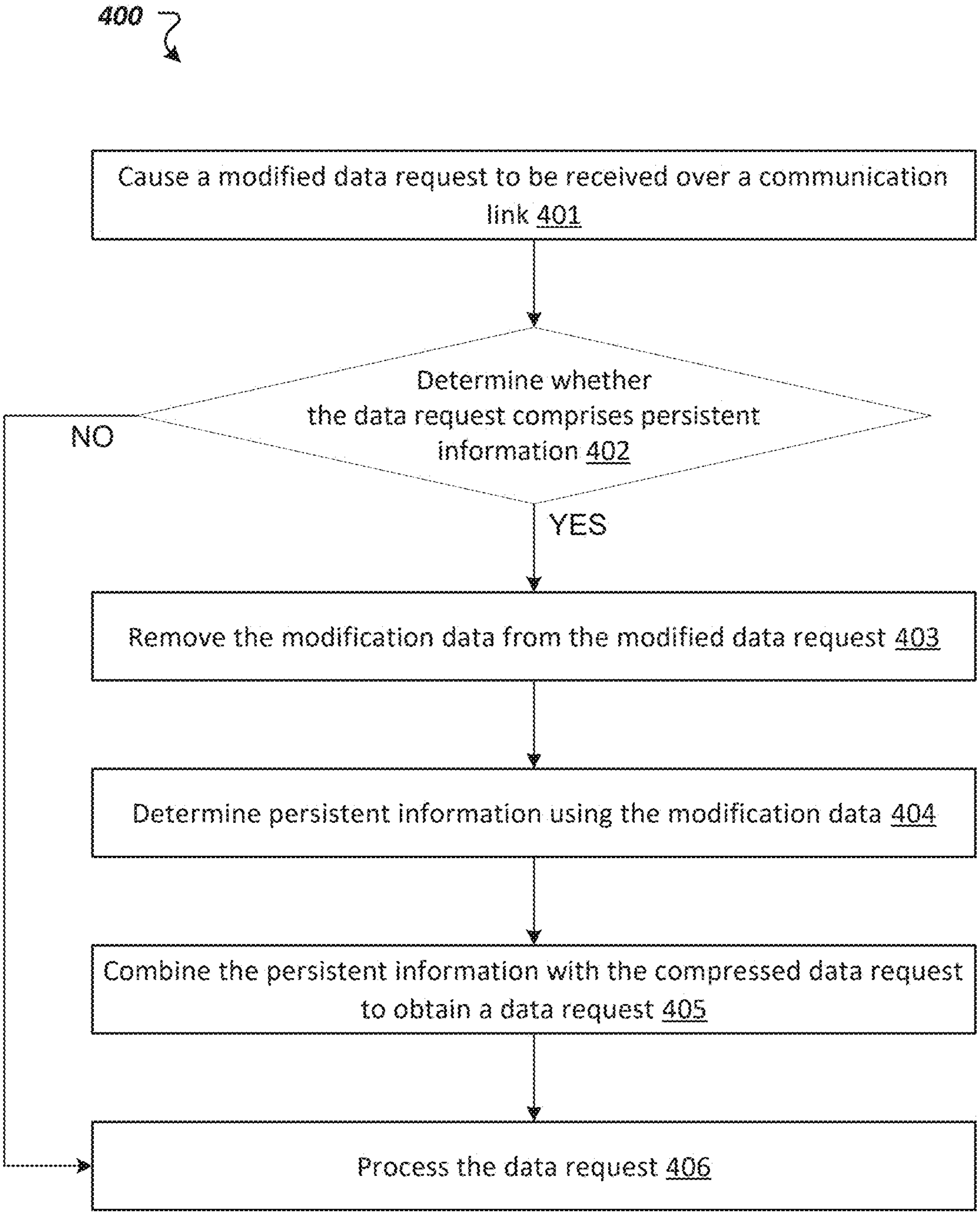
FIG. 4 is a flow diagram of an example method for expanding bandwidth over a communication channel interconnect with data request modification, according to at least one aspect of the disclosure.

FIG. 4 is a flow diagram of an example portion of a method 400 for expanding bandwidth over a communication channel interconnect with data request modification, according to at least one aspect of the disclosure. The method 400 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In at least one embodiment, the method 400 is performed by the one or more processing device(s) 111 and/or the persistent component 130A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 401, the control logic performing the method 400 causes a modified data request to be received over a communication link.

At operation 402, the control logic determines whether the data request includes persistent data. In at least one embodiment, the data request includes an indication that it contains persistent data. If the data request includes persistent data, it is a modified data request. In at least one embodiment, the control logic can use an algorithm to determine whether the data request includes persistent data. In at least one embodiment, the control logic can determine whether portions of data contained in the received data request are the same as portions of data contained in previously received data requests. In at least one embodiment, the control logic identifies that a series of data requests contain shared information, the control logic can identify the shared information as persistent data. In such embodiments, the control logic can cause an indication to be transmitted to the transmitting device to indicate the detection of persistent data, as well as corresponding modification data that identifies the persistent data (e.g., in a data structure).

At operation 403, responsive to determining the data request includes persistent data, the control logic removes the modification data from the modified data request. In at least one embodiment, modification data is removed from the data request using a bitmask and one or more logical operations.

At operation 404, the control logic determines persistent data using the modification data. In at least one embodiment, the control logic uses the modification data to identify corresponding persistent data in a data structure. In an alternative embodiment, the control logic can use the modification data and an algorithm to determine the corresponding persistent data.

At operation 405, the control logic combines the persistent data and the dynamic data to obtain a data request. The data request can represent a reconstructed version of the original data request sent by the transmitting device. In at least one embodiment, the control logic can perform one or more error-correction operations on the data request to verify that the contents of the data request have been correctly reassembled.

At operation 406, the control logic processes the data request.

Computer Systems

Figure 5:
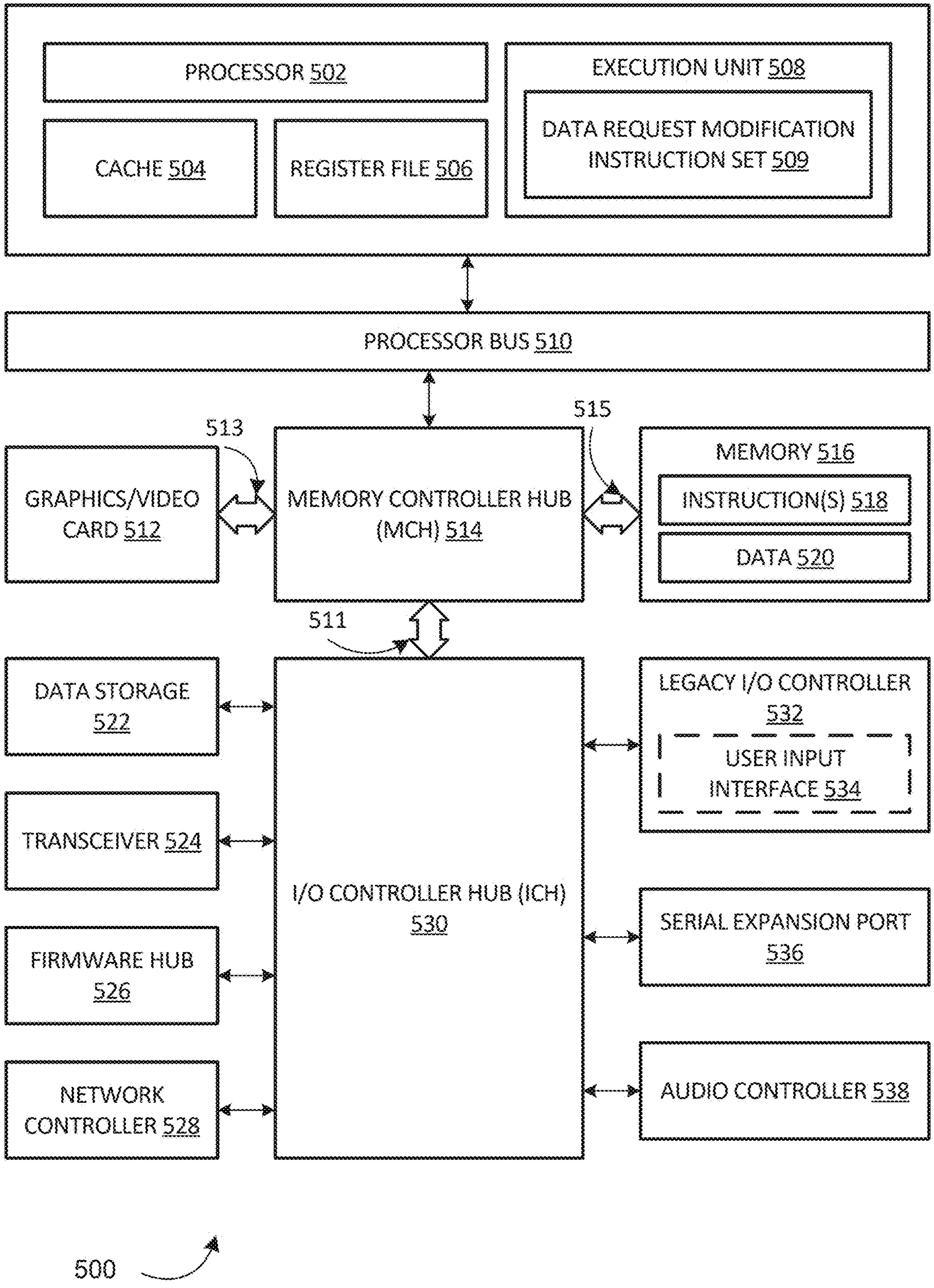
FIG. 5 is a block diagram illustrating an exemplary computer system which can be a system with interconnected devices and components, a system-on-a-chip (SOC), or some combination thereof, according to aspects of the disclosure.

FIG. 5 is a block diagram illustrating an exemplary computer system, such as computer system 500, which can be a system with interconnected devices and components, a system-on-a-chip (SOC), or some combination thereof, according to aspects of the disclosure. In at least one embodiment, computer system 500 can include, without limitation, a component, such as a processor 502, to employ execution units including logic to perform algorithms for processing data, in accordance with the present disclosure, such as in the embodiments described herein. In at least one embodiment, computer system 500 can include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In at least one embodiment, computer system 500 can execute a version of WINDOWS® operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, Internet Protocol devices, digital cameras, personal digital assistants (PDAs), and handheld PCs. In at least one embodiment, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In at least one embodiment, computer system 500 can include, without limitation, processor 502 that can include, without limitation, one or more execution units 508 to perform operations according to techniques described herein. In at least one embodiment, computer system 500 is a single-processor desktop or server system, but in another embodiment, the computer system 500 can be a multiprocessor system. In at least one embodiment, processor 502 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In at least one embodiment, processor 502 can be coupled to a processor bus 510 that can transmit data signals between processor 502 and other components in computer system 500.

In at least one embodiment, processor 502 can include, without limitation, a Level 1 (L1) internal cache memory 504. In at least one embodiment, processor 502 can have a single internal cache or multiple levels of internal cache. In at least one embodiment, the cache memory can reside external to processor 502. Other embodiments can also include a combination of both internal and external caches depending on particular implementation and needs. In at least one embodiment, register file 506 can store different types of data in various registers, including and without limitation, integer registers, floating-point registers, status registers, and instruction pointer registers.

In at least one embodiment, an execution unit 508, including and without limitation, logic to perform integer and floating-point operations, also resides in processor 502. In at least one embodiment, processor 502 can also include a microcode (μcode) read-only memory (ROM) that stores microcode for certain macro instructions. In at least one embodiment, execution unit 508 can include logic to handle a data request modification instruction set 509. In at least one embodiment, the data request modification instruction set 509 can implement one or more operations of a persistent component, such as the persistent component 130 of FIG. 1. In at least one embodiment, by including data request modification instruction set 509 in an instruction set of a general-purpose processor, such as processor 502, along with associated circuitry to execute instructions, operations used by many multimedia applications can be performed using packed data in a general-purpose processor, such as processor 502. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In at least one embodiment, execution unit 508 can also be used in microcontrollers, embedded processors, graphics devices, DSPs, and other types of logic circuits. In at least one embodiment, computer system 500 can include, without limitation, a memory 516. In at least one embodiment, memory 516 can be implemented as a Dynamic Random Access Memory (DRAM) device, a Static Random Access Memory (SRAM) device, a flash memory device, or other memory devices. In at least one embodiment, memory 516 can store instruction(s) 518 and/or data 520 represented by data signals that can be executed by processor 502.

In at least one embodiment, the system logic chip can be coupled to processor bus 510 and memory 516. In at least one embodiment, the system logic chip can include, without limitation, a memory controller hub (MCH), such as MCH 514, and processor 502 can communicate with MCH 514 via processor bus 510. In at least one embodiment, MCH 514 can provide a high bandwidth memory path 515 to memory 516 for instruction and data storage and for storage of graphics commands, data, and textures. In at least one embodiment, MCH 514 can direct data signals between processor 502, memory 516, and other components in computer system 500 and bridge data signals between processor bus 510, memory 516, and a system input/output (I/O) 511. In at least one embodiment, a system logic chip can provide a graphics port for coupling to a graphics controller. In at least one embodiment, MCH 514 can be coupled to memory 516 through a high bandwidth memory path 515, and graphics/video card 512 can be coupled to MCH 514 through an Accelerated Graphics Port (AGP) interconnect 513.

In at least one embodiment, computer system 500 can use the system I/O 511 that is a proprietary hub interface bus to couple the MCH 514 to I/O controller hub (ICH), such as ICH 530. In at least one embodiment, ICH 530 can provide direct connections to some I/O devices via a local I/O bus. In at least one embodiment, a local I/O bus can include, without limitation, a high-speed I/O bus for connecting peripherals to memory 516, chipset, and processor 502. Examples can include, without limitation, data storage 522, a transceiver 524, a firmware hub (flash Basic Input/Output System (BIOS)) 526, a network controller 528, a legacy I/O controller 532 containing a user input interface 534, a serial expansion port 536, such as Universal Serial Bus (USB), and an audio controller 538. In at least one embodiment, data storage 522 can include a hard disk drive, a floppy disk drive, a compact disc read-only memory (CD-ROM) device, a flash memory device, or other mass storage devices.

In at least one embodiment, FIG. 5 illustrates a computer system 500, which includes interconnected hardware devices or "chips," whereas, in other embodiments, FIG. 5 can illustrate an exemplary System on a Chip (SoC). In at least one embodiment, devices can be interconnected with proprietary interconnects, standardized interconnects (e.g., Peripheral Component Interconnect (PCI) buses, including PCI Express® (PCIe) buses), or some combination thereof. In at least one embodiment, one or more components of computer system 500 are interconnected using compute express link (CXL) interconnects.

Figure 6:
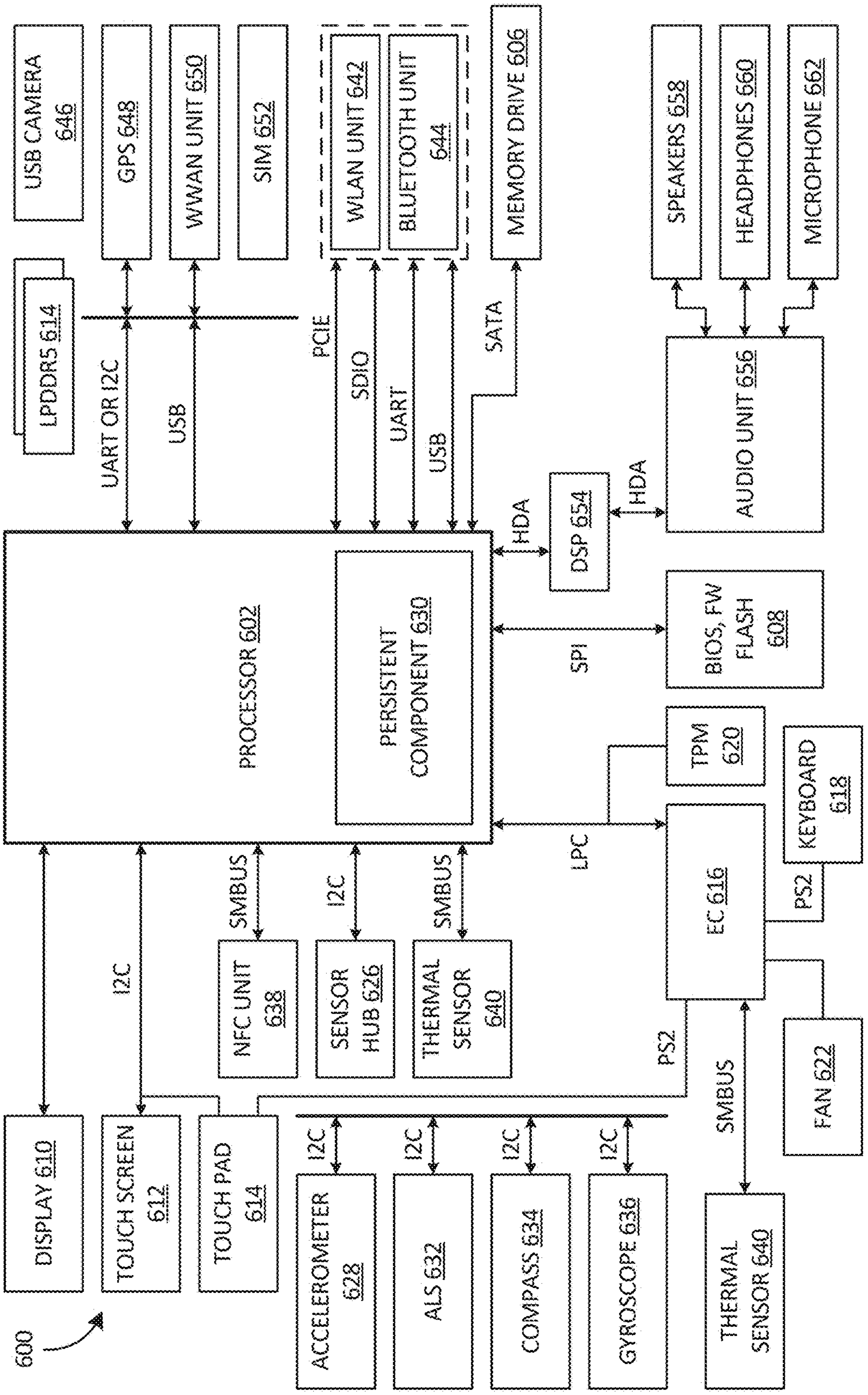
FIG. 6 is a block diagram illustrating an electronic device for utilizing a processor, according to aspects of the disclosure.

FIG. 6 is a block diagram illustrating an electronic device 600 for utilizing a processor 602, according to aspects of the disclosure. In at least one embodiment, electronic device 600 can be, for example, and without limitation, a notebook, a tower server, a rack server, a blade server, a laptop, a desktop, a tablet, a mobile device, a phone, an embedded computer, or any other suitable electronic device.

In at least one embodiment, electronic device 600 can include, without limitation, processor 602 communicatively coupled to any suitable number or kind of components, peripherals, modules, or devices. In at least one embodiment, processor 602 coupled using a bus or interface, such as an Inter-Integrated Circuit (I2C) bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including USB 1.0/1.1, USB 2.0, USB 3.0/3.1 Gen1/3.1 Gen2, and USB4), or a Universal Asynchronous Receiver/Transmitter (UART) bus. In at least one embodiment, FIG. 6 illustrates a system, which includes interconnected hardware devices or "chips," whereas in other embodiments, FIG. 6 can illustrate an exemplary System on a Chip (SoC). In at least one embodiment, devices illustrated in FIG. 6 can be interconnected with proprietary interconnects, standardized interconnects (e.g., PCIe), or some combination thereof. In at least one embodiment, one or more components of FIG. 6 are interconnected using compute express link (CXL) interconnects.

In at least one embodiment, FIG. 6 can include a display 610, a touch screen 612, a touch pad 614, a Near Field Communications unit (NFC) 638, a sensor hub 626, a thermal sensor 640, an Express Chipset (EC), such as EC 616, a Trusted Platform Module (TPM), such as TPM 620, BIOS/firmware (FW)/flash memory, such as BIOS, FW Flash 608, a DSP 654, a memory drive 606 such as a Solid State Disk (SSD) or a Hard Disk Drive (HDD), a wireless local area network unit (WLAN), such as WLAN unit 642, a Bluetooth unit 644, a Wireless Wide Area Network unit (WWAN), such as WWAN unit 650, a Global Positioning System (GPS) 648, a camera (USB 3.0 camera) 646, such as a USB 3.0 camera, and/or a Low Network bandwidth Double Data Rate (LPDDR) memory unit, such as LPDDR5 604 implemented in, for example, LPDDR5 standard. These components can each be implemented in any suitable manner.

In at least one embodiment, other components can be communicatively coupled to processor 602 through the components discussed above. In at least one embodiment, processor 602 can include a persistent component 630, such as the persistent component 130 of FIG. 1. In at least one embodiment, an accelerometer 628, Ambient Light Sensor (ALS), such as ALS 632, compass 634, and a gyroscope 636 can be communicatively coupled to sensor hub 626. In at least one embodiment, thermal sensor 640, a fan 622, a keyboard 618, and a touch pad 614 can be communicatively coupled to EC 616. In at least one embodiment, speakers 658, headphones 660, and microphone 662 can be communicatively coupled to an audio unit 656 which can, in turn, be communicatively coupled to DSP 654. In at least one embodiment, audio unit 656 can include, for example, and without limitation, an audio coder/decoder (codec) and a class-D amplifier. In at least one embodiment, a subscriber identification module (SIM) card, such as SIM 652 can be communicatively coupled to WWAN unit 650. In at least one embodiment, components such as WLAN unit 642 and Bluetooth unit 644, as well as WWAN unit 650 can be implemented in a Next Generation Form Factor (NGFF).

Figure 7:
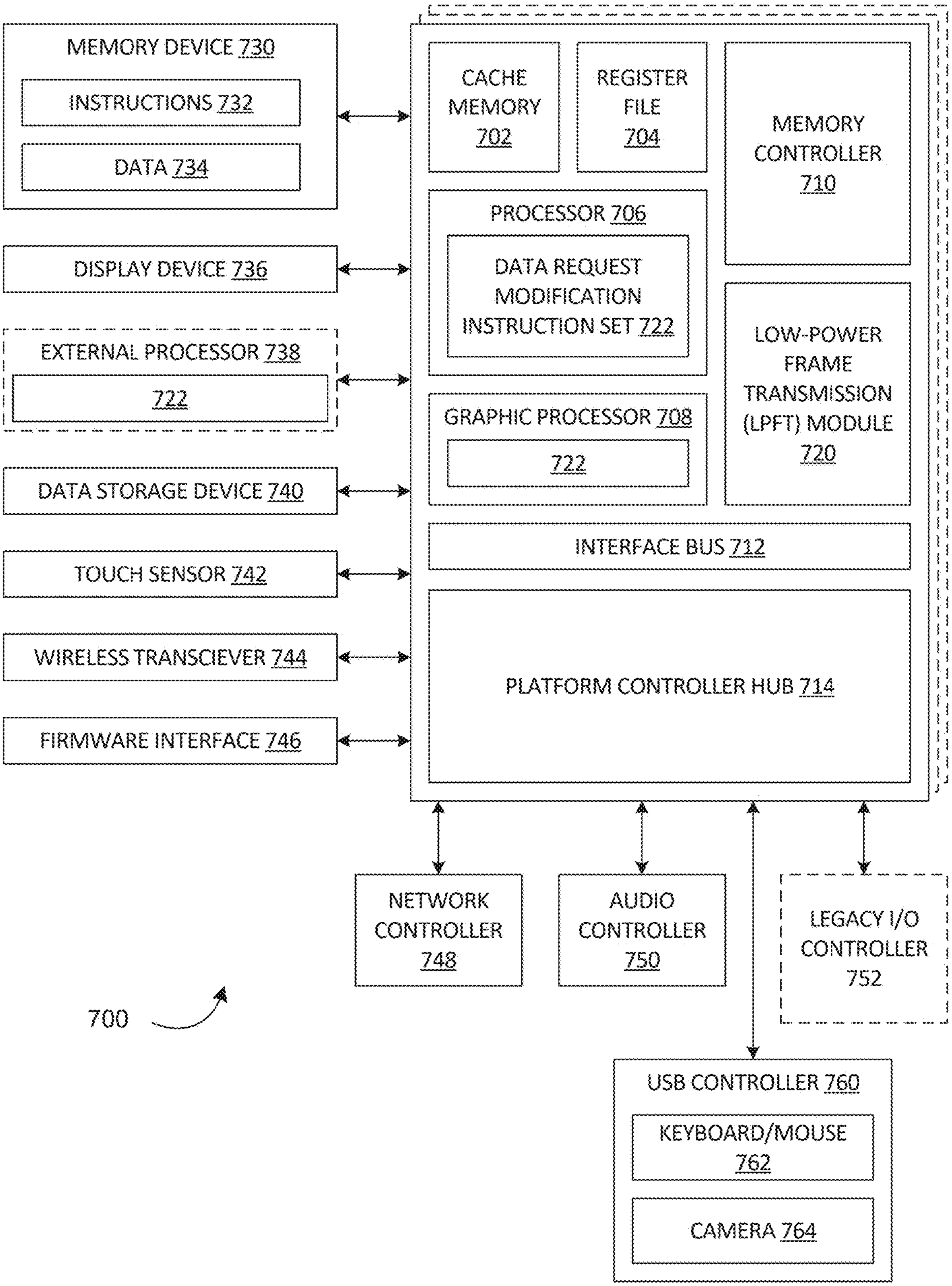
FIG. 7 is a block diagram of a processing system, according to aspects of the disclosure.

FIG. 7 is a block diagram of a processing system 700, according to aspects of the disclosure. In at least one embodiment, the processing system 700 includes cache memory 702, register file 704, processors 706, graphics processors 708, memory controller 710, interface bus 712, platform controller hub 714, and low-power frame transmission module 720. Processing system 700 can be a single processor desktop system, a multiprocessor workstation system, or a server system having a large number of processors 706 or graphics processors 708. In at least one embodiment, the processing system 700 is a processing platform incorporated within a system-on-a-chip (SoC) integrated circuit for use in mobile, handheld, or embedded devices.

In at least one embodiment, the processing system 700 can include, or be incorporated within a server-based gaming platform, a game console, including a game and media console, a mobile gaming console, a handheld game console, or an online game console. In at least one embodiment, the processing system 700 is a mobile phone, smart phone, tablet computing device, or mobile Internet device. In at least one embodiment, the processing system 700 can also include, couple with, or be integrated within, a wearable device, such as a smart watch wearable device, smart eyewear device, augmented reality device, or virtual reality device. In at least one embodiment, the processing system 700 is a television or set-top box device having one or more processors 706 and a graphical interface generated by one or more graphics processors 708.

In at least one embodiment, one or more processors 706 each include one or more of the processor cores to process instructions which, when executed, perform operations for system and user software. In at least one embodiment, one or more processors 706 and/or one or more graphics processors can be configured to process a portion of the data request modification instruction set 722. In at least one embodiment, data request modification instruction set 722 can facilitate Complex Instruction Set Computing (CISC), Reduced Instruction Set Computing (RISC), or computing via a Very Long Instruction Word (VLIW). In at least one embodiment, processor cores can each process a different instruction set from data request modification instruction set 722, which can include instructions to facilitate emulation of other instruction sets (not illustrated). In at least one embodiment, the data request modification instruction set 722 can perform one or more functions of the persistent component 130 of FIG. 1. In at least one embodiment, processor cores can also include other processing devices, such as a Digital Signal Processor (DSP).

In at least one embodiment, processors 706 include cache memory 702. In at least one embodiment, processors 706 can have a single internal cache or multiple levels of internal cache. In at least one embodiment, cache memory 702 is shared among various components of processors 706. In at least one embodiment, processors 706 also use an external cache (e.g., a Level 3 (L3) cache or Last Level Cache (LLC)) (not illustrated), which can be shared among processor cores using known cache coherency techniques. In at least one embodiment, register file 704 is additionally included in processors 706, which can include different types of registers for storing different types of data (e.g., integer registers, floating-point registers, status registers, and an instruction pointer register). In at least one embodiment, register file 704 can include general-purpose registers or other registers.

In at least one embodiment, one or more processors 706 are coupled with one or more interface bus 712 to transmit communication signals such as address, data, or control signals between processor cores and other components in processing system 700. In at least one embodiment, interface bus 712, in one embodiment, can be a processor bus, such as a version of a Direct Media Interface (DMI) bus. In at least one embodiment, interface bus 712 is not limited to a DMI bus, and can include one or more PCI buses (e.g., PCI, PCI Express), memory busses, or other types of interface busses. In at least one embodiment, processors 706 include an integrated memory controller (e.g., memory controller 710) and a platform controller hub 714 (PCH). In at least one embodiment, memory controller 710 facilitates communication between a memory device and other components of the processing system 700, while platform controller hub 714 provides connections to I/O devices via a local I/O bus.

In at least one embodiment, the memory device 730 can be a dynamic random-access memory (DRAM) device, a static random-access memory (SRAM) device, a flash memory device, a phase-change memory device, or some other memory device having suitable performance to serve as process memory. In at least one embodiment, the memory device 730 can operate as system memory for processing system 700 to store instructions 732 and data 734 for use when one or more processors 706 executes an application or process. In at least one embodiment, memory controller 710 also optionally couples with an external processor 738, which can communicate with one or more graphics processors 708 in processors 706 to perform graphics and media operations. In at least one embodiment, a display device 736 can connect to processors 706. In at least one embodiment, the display device 736 can include one or more of an internal display device, as in a mobile electronic device or a laptop device, or an external display device attached via a display interface (e.g., DisplayPort, etc.). In at least one embodiment, display device 736 can include a head-mounted display (HMD) such as a stereoscopic display device for use in virtual reality (VR) applications or augmented reality (AR) applications.

In at least one embodiment, the platform controller hub 714 enables peripherals to connect to memory device 730 and processors 706 via a high-speed I/O bus. In at least one embodiment, I/O peripherals include, but are not limited to, a data storage device 740 (e.g., hard disk drive, flash memory, etc.), a touch sensor 742, a wireless transceiver 744, firmware interface 746, a network controller 748, or an audio controller 750.

In at least one embodiment, the data storage device 740 can connect via a storage interface (e.g., SATA) or via a peripheral bus, such as a PCI bus (e.g., PCI, PCI Express). In at least one embodiment, touch sensor 742 can include touch screen sensors, pressure sensors, or fingerprint sensors. In at least one embodiment, wireless transceiver 744 can be a Wi-Fi transceiver, a Bluetooth transceiver, or a mobile network transceiver such as a 3G, 4G, Long Term Evolution (LTE), 5G, or 6G transceiver. In at least one embodiment, firmware interface 746 enables communication with system firmware and can be, for example, a unified extensible firmware interface (UEFI). In at least one embodiment, the network controller 748 can enable a network connection to a wired network. In at least one embodiment, a high-performance network controller (not illustrated) couples with interface bus 712. In at least one embodiment, audio controller 750 can be a multi-channel high-definition audio controller. In at least one embodiment, the processing system 700 includes an optional legacy I/O controller 752 for coupling legacy (e.g., Personal System-2 (PS/2)) devices to the processing system 700. In at least one embodiment, the platform controller hub 714 can also connect to one or more Universal Serial Bus (USB) controllers, such as USB controller 760 to connect input devices, such as a keyboard and mouse combination (keyboard/mouse 762), a camera 764, or other USB input devices.

In at least one embodiment, an instance of memory controller 710 and platform controller hub 714 can be integrated into a discreet external graphics processor, such as external processor 738. In at least one embodiment, the platform controller hub 714 and/or memory controller 710 can be external to one or more processors 706. For example, in at least one embodiment, the processing system 700 can include an external memory controller (e.g., memory controller 710) and the platform controller hub 714, which can be configured as a memory controller hub and peripheral controller hub within a system chipset that is in communication with the processors 706.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set can be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., can be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, can be used. It should be understood that these terms cannot be intended as synonyms for each other. Rather, in particular examples, "connected" or "coupled" can be used to indicate that two or more elements are in direct or indirect physical or electrical contact with each other. "Coupled" can also mean that two or more elements are not in direct contact with each other but yet still co-operate or interact with each other.

Unless specifically stated otherwise, it can be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" can refer to any device or portion of a device that processes electronic data from registers and/or memory and transform that electronic data into other electronic data that can be stored in registers and/or memory. As non-limiting examples, a "processor" can be a CPU or a GPU. A "computing platform" can comprise one or more processors. As used herein, "software" processes can include, for example, software and/or hardware entities that perform work over time, such as tasks, threads, and intelligent agents. Also, each process can refer to multiple processes for carrying out instructions in sequence or in parallel, continuously, or intermittently. The terms "system" and "method" are used herein interchangeably insofar as a system can embody one or more methods, and methods can be considered a system.

In the present document, references can be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References can also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures can be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A device comprising:

a memory; and one or more processing devices operatively coupled to the memory, the one or more processing devices to:

determine that a data request comprises first persistent data;

remove the first persistent data from the data request to obtain first dynamic data;

generate first modification data representing the first persistent data, wherein the first modification data comprises a reference value identifying a first logical location of the first persistent data in a first data structure of the memory, and wherein a size of the first modification data is smaller than a size of the first persistent data;

combine the first dynamic data and the first modification data to obtain a first modified data request; and cause the first modified data request to be transmitted to a second device over a communication link.

2. The device of claim 1, wherein the reference value identifies a second logical location of the first persistent data in a second data structure of a second memory of the second device.

3. The device of claim 1, wherein to determine the reference value of the first modification data, the one or more processing devices to:

determine that a first communication policy corresponds to the data request;

identify the first logical location of the first persistent data in the first data structure based on the first communication policy; and assign the first logical location of the first persistent data as the reference value.

4. The device of claim 3, wherein to determine that the first communication policy corresponds to the data request, the one or more processing devices to determine that a portion of the data request satisfies a first condition of the first communication policy.

5. The device of claim 1, wherein the one or more processing devices further to:

cause a second modified data request to be received over the communication link;

determine that the second modified data request comprises second dynamic data and second modification data;

remove the second modification data from the second modified data request;

determine second persistent data using the second modification data;

combine the second persistent data with the second dynamic data to obtain a second data request; and process the second data request.

6. The device of claim 1, wherein the one or more processing devices further to:

determine that a second data request does not comprise second persistent data; and cause the second data request to be transmitted to the second device over the communication link.

7. A system comprising:

a first device comprising a first data structure; and a second device coupled to the first device by a communication link, the second device comprising:

a second data structure, wherein first values of first entries of the first data structure match second values of second entries of the second data structure;

a memory; and one or more processing devices operatively coupled to the memory, the one or more processing devices to:

determine that a data request to be transmitted to the first device comprises first persistent data;

remove the first persistent data from the data request to obtain first dynamic data;

generate first modification data representing the first persistent data, wherein the first modification data comprises a reference value identifying a first logical location of the first persistent data in the first data structure of the first device, and wherein a size of the first modification data is smaller than a size of the first persistent data;

combine the first modification data and the first dynamic data to obtain a first modified data request; and cause the first modified data request to be transmitted to the first device over the communication link.

8. The system of claim 7, wherein the reference value identifies a second logical location of the first persistent data in the second data structure of the second device.

9. The system of claim 7, wherein to determine the reference value of the first modification data, the one or more processing devices of the second device to:

determine that a first communication policy corresponds to the data request;

identify the first logical location of the first persistent data in the first data structure based on the first communication policy; and assign the first logical location of the first persistent data as the reference value.

10. The system of claim 9, wherein to determine that the first communication policy corresponds to the data request, the one or more processing devices of the second device to determine that a portion of the data request satisfies a first condition of the first communication policy.

11. The system of claim 7, wherein the one or more processing devices of the second device further to:

cause a second modified data request to be received over the communication link;

determine that the second modified data request comprises second dynamic data and second modification data;

remove the second modification data from the second modified data request;

determine second persistent data using the second modification data;

combine the second persistent data and the second dynamic data to obtain a second data request; and process the second data request.

12. The system of claim 7, wherein the one or more processing devices of the second device further to:

determine that a second data request does not comprise second persistent data; and cause the second data request to be transmitted to the first device over the communication link.

13. A method comprising:

determining that a data request comprises first persistent data;

removing the first persistent data from the data request to obtain first dynamic data;

generating first modification data representing the first persistent data, wherein the first modification data comprises a reference value identifying a first logical location of the first persistent data in a first data structure of a first device, and wherein a size of the first modification data is smaller than a size of the first persistent data;

combining the first modification data and the first dynamic data to obtain a first modified data request; and causing the first modified data request to be transmitted over a communication link.

14. The method of claim 13, wherein the reference value identifies a second logical location of the first persistent data in a second data structure of a second device.

15. The method of claim 13, wherein generating the first modification data comprises:

determining that a first communication policy corresponds to the data request;

identifying the first logical location of the first persistent data in the first data structure based on the first communication policy; and assigning the first logical location of the first persistent data as the reference value.

16. The method of claim 13 further comprising:

causing a second modified data request to be received over the communication link;

determining that the second modified data request comprises second dynamic data and second modification data;

removing the second modification data from the second modified data request;

determining second persistent data using the second modification data;

combining the second persistent data and the second dynamic data to obtain a second data request; and processing the second data request.

17. The method of claim 13 further comprising:

determining that a second data request does not comprise second persistent data; and causing the second data request to be transmitted over the communication link.

* * * * *